United States Patent
Davis

(10) Patent No.: US 10,935,139 B2
(45) Date of Patent: Mar. 2, 2021

(54) DUAL-ENDED BRUSH SEAL ASSEMBLY AND METHOD OF MANUFACTURE

(71) Applicant: United Technologies Corporation, Farmington, CT (US)

(72) Inventor: Timothy M. Davis, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 95 days.

(21) Appl. No.: 16/515,548

(22) Filed: Jul. 18, 2019

(65) Prior Publication Data

US 2020/0103036 A1  Apr. 2, 2020

Related U.S. Application Data

(62) Division of application No. 14/836,302, filed on Aug. 26, 2015, now Pat. No. 10,400,896.

(60) Provisional application No. 62/043,117, filed on Aug. 28, 2014.

(51) Int. Cl.

| F16J 15/3288 | (2016.01) |
| F01D 11/00 | (2006.01) |
| F01D 25/24 | (2006.01) |
| B23K 31/02 | (2006.01) |
| F16J 15/3268 | (2016.01) |
| F16J 15/328 | (2016.01) |

(52) U.S. Cl.
CPC .......... *F16J 15/3288* (2013.01); *B23K 31/02* (2013.01); *F01D 11/005* (2013.01); *F01D 25/246* (2013.01); *F16J 15/328* (2013.01); *F16J 15/3268* (2013.01); *F05D 2240/11* (2013.01); *F05D 2240/56* (2013.01); *F05D 2300/175* (2013.01)

(58) Field of Classification Search
CPC ............... F16J 15/3268; F16J 15/3288; F05D 2240/56; F05B 2240/571; F01D 11/005
USPC .......................... 277/355; 415/173.3, 174.2
See application file for complete search history.

(56) References Cited

U.S. PATENT DOCUMENTS

| 5,114,159 A | 5/1992 | Baird et al. |
| 5,975,535 A | 11/1999 | Gail et al. |
| 6,059,526 A | 5/2000 | Mayr |
| 6,170,831 B1 | 1/2001 | Bouchard |
| 6,406,027 B1 | 6/2002 | Aksit et al. |
| 6,695,314 B1 | 2/2004 | Gail et al. |
| 6,711,858 B1 * | 3/2004 | Albanese ............... D04D 5/00 428/93 |
| 6,808,180 B2 | 10/2004 | Shore |
| 7,290,769 B2 | 11/2007 | Plona et al. |
| 8,235,392 B2 | 8/2012 | Gail et al. |
| 8,568,091 B2 * | 10/2013 | McCaffrey ............ F01D 11/125 415/173.3 |
| 9,689,497 B2 * | 6/2017 | Inoue ..................... F01D 11/00 |

(Continued)

*Primary Examiner* — Kristina R Fulton
*Assistant Examiner* — L. Susmitha Koneru
(74) *Attorney, Agent, or Firm* — Getz Balich LLC

(57) ABSTRACT

A dual-ended brush seal assembly that may be for turbine engine includes a first structure having a first surface and a second structure having a second surface. A brush seal of the assembly includes a bent bristle pack having a first end in sealing contact with the first surface and an opposite second end in sealing contact with the second surface. The first and second ends project in respective first and second directions that generally traverse one-another.

16 Claims, 5 Drawing Sheets

(56) References Cited

U.S. PATENT DOCUMENTS

| | | | |
|---|---|---|---|
| 2002/0079654 A1* | 6/2002 | Aksit | F16J 15/3288 277/650 |
| 2002/0189096 A1* | 12/2002 | Flower | F16J 15/3268 29/888.3 |
| 2004/0100033 A1 | 5/2004 | Tong et al. | |
| 2008/0063831 A1 | 3/2008 | Kanzaki et al. | |
| 2008/0128996 A1* | 6/2008 | Grace | F16J 15/3288 277/355 |
| 2010/0007093 A1 | 1/2010 | Grondahl | |
| 2010/0327535 A1* | 12/2010 | Grace | F16J 15/3288 277/355 |
| 2011/0304101 A1 | 12/2011 | Grondahl et al. | |
| 2012/0251303 A1 | 10/2012 | Zheng et al. | |
| 2013/0170979 A1 | 7/2013 | Sha | |
| 2015/0322807 A1* | 11/2015 | Budnick | F01D 9/041 277/654 |
| 2015/0345318 A1 | 12/2015 | Zheng et al. | |
| 2015/0354707 A1* | 12/2015 | Inoue | F01D 11/00 277/355 |
| 2016/0024926 A1* | 1/2016 | Jaureguiberry | F01D 9/04 416/182 |
| 2016/0032750 A1* | 2/2016 | Schirtzinger | F01D 11/001 277/650 |
| 2016/0115811 A1* | 4/2016 | Davis | F16J 15/0887 277/591 |
| 2016/0115814 A1 | 4/2016 | Davis et al. | |
| 2016/0281522 A1* | 9/2016 | Graf | F01D 9/00 |

* cited by examiner

DUAL-ENDED BRUSH SEAL ASSEMBLY AND METHOD OF MANUFACTURE

This application is a divisional of U.S. patent application Ser. No. 14/836,302 filed Aug. 26, 2015, which claims priority to U.S. patent application Ser. No. 62/043,117 filed Aug. 28, 2014, both of which are hereby incorporated herein by reference in their entireties.

BACKGROUND

The present disclosure relates to a seal assembly and, more particularly, to a thermally protected seal assembly for a turbine engine.

A turbine engine includes a plurality of seals of varying sizes and shapes to control leakage and gas flow. Many of the seals seal gaps between parts that may be exposed to hot air temperatures and temperature differentials that cause thermal displacement. Accordingly, any seal is required to seal against undesired leakage, but also accommodate relative movement between parts. Moreover, each seal should provide a level of durability capable of withstanding wear encountered as a result of relative movement, vibration and high temperature.

SUMMARY

A dual-ended brush seal assembly according to a, non-limiting, embodiment of the present disclosure includes a first structure including a first surface; a second structure including a second surface; and a brush seal including a bent bristle-pack having a first end projecting in a first direction and in sealing contact with the first surface and an opposite second end projecting in a second direction and in sealing contact with the second surface, wherein the first and second directions traverse one-another.

Additionally to the foregoing embodiment, the first structure is a BOAS ring and the second structure is a vane shroud ring.

In the alternative or additionally thereto, in the foregoing embodiment, the brush seal is generally annular.

In the alternative or additionally thereto, in the foregoing embodiment, the first surface is orientated substantially normal to the second surface.

In the alternative or additionally thereto, in the foregoing embodiment, the brush seal is free-floating.

In the alternative or additionally thereto, in the foregoing embodiment, the brush seal includes first and second sheets each having an arcuate cross section with the bristle-pack extending therebetween.

In the alternative or additionally thereto, in the foregoing embodiment, the brush seal includes a weld that fuses the bristle-pack and at least one of the first and second sheets together.

In the alternative or additionally thereto, in the foregoing embodiment, the first and second structures are generally annular and concentric to one-another with the first surface spanning substantially axially and the second surface spanning substantially radially.

In the alternative or additionally thereto, in the foregoing embodiment, the assembly includes at least one resilient member disposed axially between a third surface of the first structure that opposes the second surface, and the brush seal for biasing the second end against the second surface.

In the alternative or additionally thereto, in the foregoing embodiment, the resilient member is an annular wave-spring.

In the alternative or additionally thereto, in the foregoing embodiment, the brush seal includes first and second sheets each having an arcuate cross section with the bristle-pack extending therebetween and at least one of the first and second sheets are made of a non-hardenable nickel-based alloy.

In the alternative or additionally thereto, in the foregoing embodiment, the non-hardenable nickel-based alloy is at least one of INCONEL 625 (AMS 5599), HASTALOY X (AMS 5536) and HAYNES 188 (AMS 5891).

A dual-ended brush seal according to another, non-limiting, embodiment includes an annular bristle-pack having a sealing first end and an opposite sealing second end; and first and second sheets each having an arcuate cross section with the bristle-pack extending therebetween.

Additionally to the foregoing embodiment, the seal includes a weld that fuses the bristle-pack and at least one of the first and second sheets together.

In the alternative or additionally thereto, in the foregoing embodiment, the first end is constructed and arranged to seal in a direction that generally traverses a sealing direction of the second end.

In the alternative or additionally thereto, in the foregoing embodiment, the first and second ends are constructed and arranged to seal substantially radially.

In the alternative or additionally thereto, in the foregoing embodiment, the second sheet includes a plurality of tabs for crimping against the bristle-pack.

A method of manufacturing a dual-ended brush seal according to another, non-limiting, embodiment includes the steps of bending a bristle-pack about a bent first sheet; sliding a second sheet over the bristle-pack such that the bristle-pack is located between the first and second sheets and opposite distal ends of the bristle pack project outward from the first and second sheets; and crimping the second sheet toward the first sheet and against the bristle pack.

Additionally to the foregoing embodiment, the method includes the step of welding at least one of the first and second sheets to the bristle-pack.

In the alternative or additionally thereto, in the foregoing embodiment, the method includes the step of cutting the distal ends into prescribed final dimensions.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
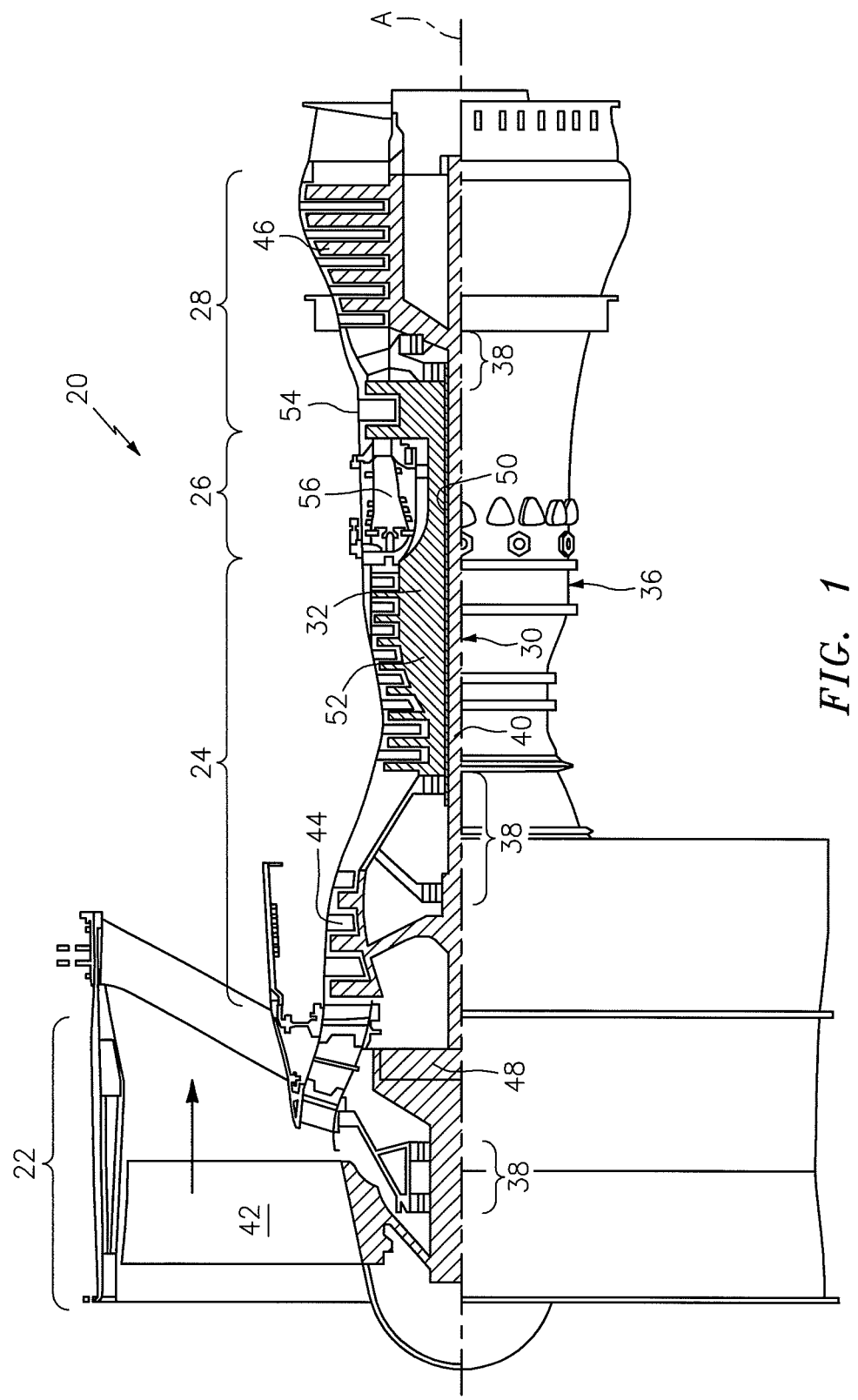
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path 'B' due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7)^{0.5}$, where "T" represents the ambient temperature in degrees Rankine. The Low Corrected Fan Tip Speed according to one non-limiting example of the gas turbine engine 20 is less than about 1150 feet per second (351 meters per second).

Figure 2:
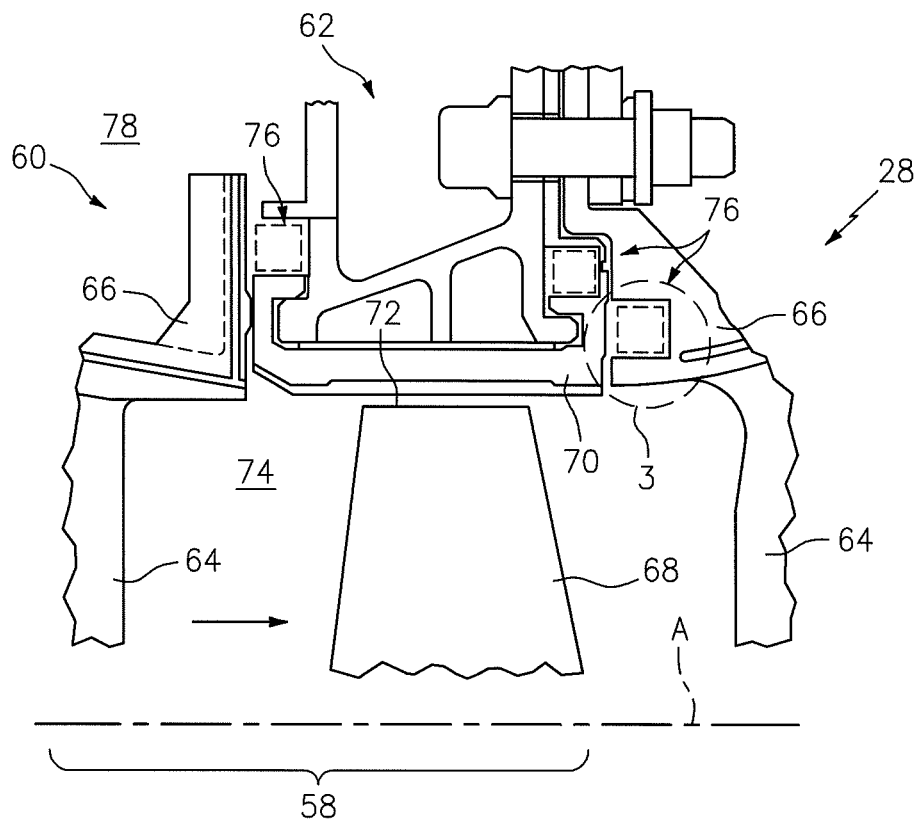
FIG. 2 is a partial sectional view of a turbine section of the engine according to one, non-limiting embodiment of the present disclosure.

Referring to FIG. 2, the turbine section 28 may include a plurality of stages 58 each having a forward, stationary, vane assembly 60 and an axially aft blade assembly 62 generally in the core flowpath. As illustrated, one complete stage 58 is shown along with a vane assembly 60 of an adjacent and downstream stage. Each vane assembly 60 has a plurality of vanes 64 spaced circumferentially from one-another and radially extending between, and supported by, circumferentially extending inner and outer structures or shroud rings 66 disposed concentrically to engine axis A (only the outer shroud ring shown). The shroud rings 66 along with the vanes 64 may be formed as one unitary piece, or each vane 64 or any number of vanes may be formed to individual, circumferential, segments of the shroud ring 66, that when assembled, form a complete ring.

Each blade assembly 62 has a plurality of rotating blades 68 and a stationary structure or blade outer air seal (BOAS) ring 70 that may be segmented circumferentially. The blades 68 are spaced circumferentially from one-another and project radially outward from, and engaged to, a rotor (not shown) centered to the engine axis A and to a distal tip 72 of the blade 68. The distal tip 72 is in close association with the BOAS ring 70 to minimize or eliminate any flow leakage or bypass of hot core engine air flowing (i.e. between the ring 70 and tip 72) through an engine core flowpath 74 generally defined radially between the inner and outer shroud rings 66 of the vane assemblies 60 and the BOAS ring 70 and blade platforms of the blades 68 (not shown).

Figure 3:
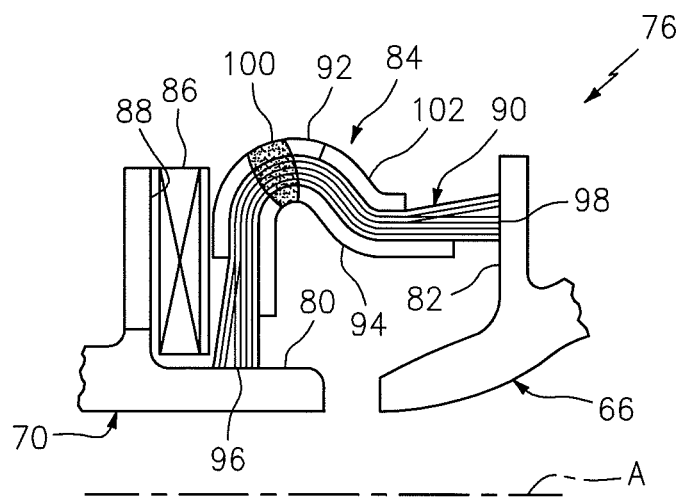
FIG. 3 is an enlarged cross section of a seal assembly taken from circle 3 of FIG. 2.

Referring to FIGS. 2 and 3, at least one annular, brush seal, assembly 76 may be located between the outer shroud ring 66 of the vane assembly 60 and the BOAS ring 70 of the blade assembly 62 for the prevention of unwanted cooling air leakage from a secondary cooling flowpath 78 (generally defined radially between the engine case 36 and the rings 66, 70) and into the hot core flowpath 74. Traditionally, such sealing is accomplished through W-shaped seals, and/or seals without bristle-packs, typically made of hardened metal alloys and very thin sheet stock that are susceptible to cracking and wear.

The brush seal assembly 76 may generally include a first surface 80 carried by the structure or BOAS ring 70, a second surface 82 carried by the structure or shroud ring 66, a dual-ended brush seal 84 in sealing relationship between the surfaces 80, 82, and a resilient member 86 located between a third surface 88 of the BOAS ring 70 and the dual-ended brush seal 84 for biasing the seal 84 against the second surface 82. It is further contemplated and understood that the component relationships may be interchanged. For example, the resilient member 86 may be located between a third surface of the ring 66 (not shown) and the dual-ended brush seal 84. Furthermore, application of the brush seal assembly 76 may not be limited to sealing between a shroud ring 66 and a BOAS ring 70 but any stationary structures that may be part of a gas turbine engine or otherwise.

The first surface 80 of the BOAS ring 70, in the present example, is generally annular and faces substantially in an axial direction. The second surface 82 of the outer shroud ring 66 may be circumferentially continuous and faces radially outward with respect to axis A, and the third surface 88 of the BOAS ring 70 may be annular, substantially normal to the first surface 80, and opposed to the second surface 82.

The dual-ended brush seal 84 is annular, may be generally L-shaped in cross section, and extends circumferentially with respect to axis A. Seal 84 includes a bristle-pack 90 that is compressed, or otherwise engaged between two metallic sheets 92, 94. The bristle-pack 90 may be continuous, and thus spans between opposite first and second ends 96, 98 each projecting outward from the sheets 92, 94 in respective directions that may traverse one-another. The first end 96 may be in sealing contact with the first surface 80 of the BOAS ring 70 and the second end 98 may be in sealing contact with the second surface 82 of the shroud ring 66. Unlike that required for more traditional W-shaped seals, either one or both of the surfaces 80, 82 may not be planar and may further be stair-stepped or contoured with the brush ends 96, 98, respectively, contoured to provide sufficient sealing. Each wire of the bristle-pack 90 may be about 0.002 inches (0.051 millimeters) in diameter with a material composition of a superalloy such as cobalt-based HAYNES 25 (AMS 5759). Other high temperature material compositions for the bristle-pack may include a nickel-based superalloy, Waspaloy (a United States registered trademark of United Technologies Corporation, Hartford, Conn.) and a nickel-chromium based superalloy, INCO 625, depending on temperature exposure and deflection requirements of a particular application.

The radially outer and inner sheets 92, 94 are arcuate in cross section. In the present example, the arcuate cross sections of each sheet 92, 94 are convoluted having multiple bends (three bends illustrated) for guiding the ends 96, 98 in the appropriate directions. More specifically and during manufacture, a circumferential series of angled bristle tufts of the annular bristle-pack 90 may be bent around the convoluted inner sheet 94. The annular outer sheet 92 may be slid axially over the bristle pack and a cylindrical portion of the outer sheet 92 may then be bent radially inward to conform to and/or crimp the bristles. The sheets 92, 94 and bristle-pack 90 may then be laser welded together forming a weld 100 at a radially outward location, and the brush ends 96, 98 cut and formed to final dimensions. One example of a cutting technique is electrical discharge machining (EDM).

Unlike more traditional brush seals, subsequent manufacturing heat treat cycle(s) of seal 84 may not be necessary since the seal 84 may not develop hoop stresses typical of a diametrally snapped-in seals. At least the outer sheet 92 may further include a series of open ended and circumferentially spaced slots that divide an axially downstream portion of the outer sheet 92 into a plurality of axially extending tabs 102 that may be crimped radially inward against the bristle-pack 90 during manufacture. It is further contemplated and understood that in addition to the outer sheet 92, or alternatively, the inner sheet 94 may have similar slots and tabs.

Each sheet 92, 94 may be made of high temperature resistant and lower strength (contrary to more traditional seals for such applications) alloys. Examples of alloys include non-hardenable nickel-based alloys such as INCONEL 625 (AMS 5599), HASTALOY X (AMS 5536) and HAYNES 188 (AMS 5891). These materials are more resistant to wear and cracking, and are more compatible with the higher operating temperatures of more current turbine engines such as the geared gas turbine engine previously described. Furthermore, since the seal 84 is less structurally challenged than traditional brush seals, higher temperature capable and lower cost alloys can be used.

Figure 4:
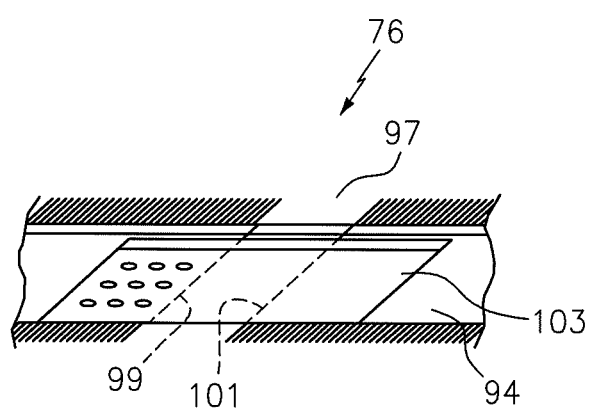
FIG. 4 is a plan view of a sliding bridge of the seal assembly.

Referring to FIG. 4, seal 84 may have at least one circumferential split or splice 97 that maintains a pressure loaded, radial, contact regardless of relative thermal displacements. The split 97 may generally be defined between two generally opposing end portions 99, 101 of the seal 84 that are substantially parallel to one-another and cut at a substantial angle. The split 97 may be generally sealed by a sliding bridge 103 that spans circumferentially across the split 97 and limits leakage at the splice location. The bridge 103 may generally be located radially inward of the inner sheet 94, rigidly attached to the inner sheet 94 at the end portion 99 location (e.g. resistance welded), and may further be in a sliding relationship with the inner sheet 94 at the end portion 101 location. The cross sectional contour of the bridge 103 may generally conform to the cross sectional contour of the inner sheet 94. It is further contemplated and understood that the seal 84 may not require a split. Furthermore, the bridge 103 may be located radially outward of the outer sheet 92 and thus attached to the outer sheet 92 at the end portion 99.

In operation, the seal 84 may generally be free-floating and the pressure differential between the secondary cooling flowpath 78 and the core flowpath 74 loads the seal 84 against the axial (i.e. cylindrical) surface 80 and the radial (i.e. annular) surface 82. As the BOAS ring 70 and shroud ring 66 move axially and radially relative to each other, the brush ends 96, 98 of the bristle-pack 90 deflect against and slide along the mating surfaces to maintain sealing.

The resilient member 86 may be a wave spring that may be generally annular and circumferentially continuous. The member 86 is compressed axially, with respect to axis A, between the third surface 88 of the BOAS ring 70 and the outer sheet 92 of the seal 84. In operation, the resilient member 86 applies a relatively light axial load during assembly to ensure the seal 84 is immediately pressure-energized during engine start-up. Other than the contact of the member 86 with the seal 84, the seal may generally be free floating with respect to the rings 66, 70 while maintaining a sealing contact thereto.

Figure 5:
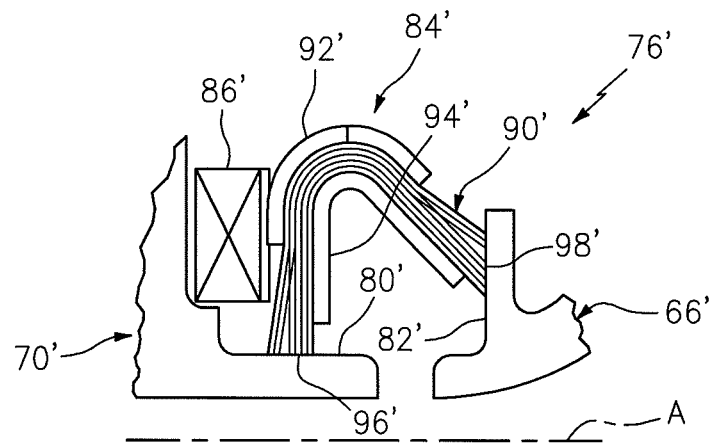
FIG. 5 is a second embodiment of a seal assembly.

Referring to FIG. 5, a second embodiment of the present disclosure is illustrated wherein like elements to the first embodiment have like identifying numerals except with the addition of a prime symbol. A brush seal assembly 76' of the second embodiment includes a first surface 80' carried by a BOAS ring 70', a second surface 82' carried by a shroud ring 66', a dual-ended brush seal 84' in sealing relationship between the surfaces 80', 82', and a resilient member 86' located between a third surface 88' of the BOAS ring 70' and the dual-ended brush seal 84'. Seal 84' includes a bristle-pack 90' engaged between two sheets 92', 94'. The bristle-pack 90' has projecting first and second ends 96', 98' with the first end 96' in sealing contact with the first surface 80' of the BOAS ring 70' and the second end 98' in sealing contact with the second surface 82' of the shroud ring 66'.

The seal 84' may generally be bent at an acute angle with the first end 96' projecting in a radially inward direction that is substantially normal to the first surface 80' and the second end 98' projecting in both an axial and radially inward direction such that the second end 98' is generally angled with respect to the second surface 82'. As previously described, the second end 98' may be cut and formed to final dimensions enabling a sealing contact upon the second surface 82'. The seal 84' is generally compact, easy to manufacture, and has resilient characteristics.

Figure 6:
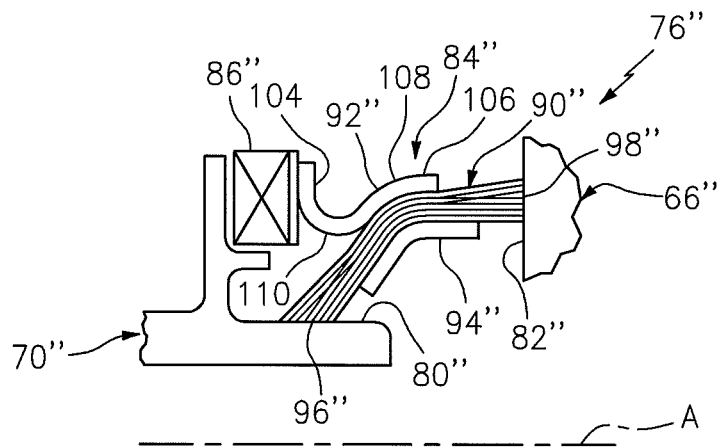
FIG. 6 is a third embodiment of a seal assembly.

Referring to FIG. 6, a third embodiment of the present disclosure is illustrated wherein like elements to the first embodiment have like identifying numerals except with the addition of a double prime symbol. A brush seal assembly 76" of the third embodiment includes a first surface 80" carried by a BOAS ring 70", a second surface 82" carried by a shroud ring 66", a dual-ended brush seal 84" in sealing relationship between the surfaces 80", 82", and a resilient member 86" located between a third surface 88" of the BOAS ring 70" and the dual-ended brush seal 84". Seal 84" includes a bristle-pack 90" engaged between radially outer and inner sheets 92", 94". The bristle-pack 90" has projecting first and second ends 96", 98" with the first end 96" in sealing contact with the first surface 80" of the BOAS ring 70" and the second end 98" in sealing contact with the second surface 82" of the shroud ring 66".

The seal 84" may generally be bent at an obtuse angle with the first end 96" projecting in both an axial and radially inward direction such that the first end 96" is generally angled with respect to the first surface 80" and the second end 98" projects in an axial direction that is substantially normal to the second surface 82". The outer sheet 92" has an axially upstream portion 104, a downstream portion 106, a generally outward face 108 and an opposite face 110. The upstream portion 104 is generally bent and projects radially outward from the downstream portion 106, away from (i.e. spaced from) the bristle-pack 90", and is in biased contact with the resilient member 86". More specifically, face 110, which is carried by both portions 104, 106, may be in direct contact with both the bristle pack 90" and the resilient member 86". The seal 84" may enable positioning at more optimum sealing locations in the engine.

Figure 7:
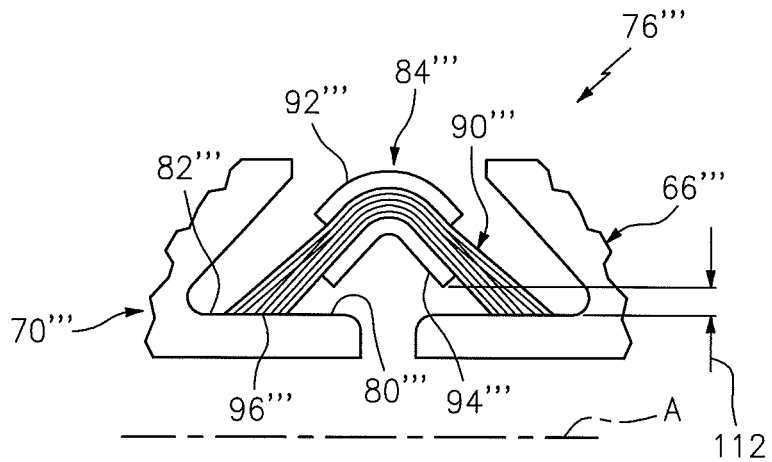
FIG. 7 is a fourth embodiment of a seal assembly.

Referring to FIG. 7, a fourth embodiment of the present disclosure is illustrated wherein like elements to the first embodiment have like identifying numerals except with the addition of a triple prime symbol. A brush seal assembly 76''' of the fourth embodiment includes a first surface 80''' carried by a BOAS ring 70''', a second surface 82" carried by a shroud ring 66', and a dual-ended brush seal 84" in sealing relationship between the surfaces 80''', Seal 84" includes a bristle-pack 90' engaged between radially outer and inner sheets 92', 94'. The bristle-pack 90''' has projecting first and second ends 96', 98" with the first end 96''' in sealing contact with the first surface 80''' of the BOAS ring 70''' and the second end 98''' in sealing contact with the second surface 82' of the shroud ring 66'.

The first and second surfaces 80', 82''' are both substantially cylindrical and face radially outward. The seal 84" may generally be bent at about a right angle with the first end 96''' projecting in both an axial upstream and radially inward direction such that the first end 96''' is generally angled with respect to the first surface 80'''. Similarly, the second end 98' projects in both an axial downstream and radially inward direction with the second end 98''' angled with respect to the second surface 82'. Because of the circular/annular orientation of the rings 66', 70''' and seal 84''', the seal may generally be free floating with respect to the rings. Advantages of seal 84" include, but are not limited to, sealing against two radial surfaces and a low radial profile.

The inner sheet 94" of the seal 84' may have opposite edges positioned radially outward from the respective sealing surfaces 80''', 82" by a predetermined distance or gap 112. The gap 112 may be minimized to further reduce air leakage during normal engine operation and as the bristles wear.

Figure 8:
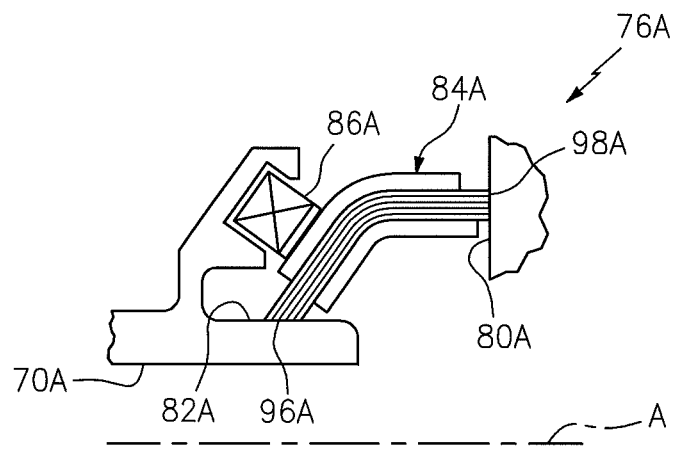
FIG. 8 is a fifth embodiment of a seal assembly.

Referring to FIG. 8, a fifth embodiment of the present disclosure is illustrated that is similar to the third embodiment of FIG. 5, and wherein like elements to the third embodiment have like identifying numerals except with the new suffix "A". A brush seal assembly 76A of the fifth embodiment includes a BOAS ring 70A that generally holds and positions a resilient member 86A to exert a biasing force against a dual ended brush seal 84A. This biasing force is generally in an angled direction with respect to the engine axis A, and is in both a radially inward direction and an axial direction. The member 86A may be a wave spring. The biasing force direction (i.e. angled) enables a compact design of the assembly 76A and ensures the first and second ends 96A, 98A remain in sealing contact with the respective first and second surfaces 80A, 82A.

Figure 9:
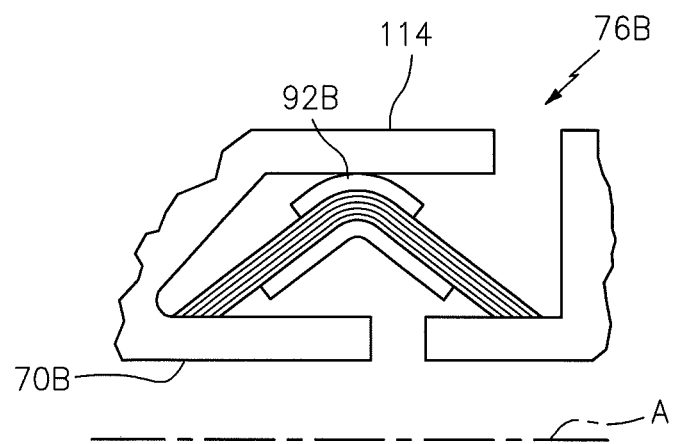
FIG. 9 is a sixth embodiment of a seal assembly.

Referring to FIG. 9, a sixth embodiment of the present disclosure is illustrated that is similar to the fourth embodiment of FIG. 6, and wherein like elements to the fourth embodiment have like identifying numerals except with the new suffix "B". A brush seal assembly 76B of the sixth embodiment includes a BOAS ring 70B having a cantilevered portion 114 that extends axially and radially over the outer sheet 92B to protect and generally hold the brush seal 84B in place. The sheet 92B may further contact the cantilevered portion 114 thereby biasing the bristles against the respective sealing surfaces.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed:
1. A dual-ended brush seal assembly comprising:
a first structure including a first surface;
a second structure including a second surface; and
a brush seal including a bent bristle-pack having a first end and an opposite second end, the first end projecting in a first direction and in sealing contact with the first surface, and the opposite second end projecting in a second direction and in sealing contact with the second surface, wherein the first and second directions traverse one-another, and the brush seal includes first and second sheets each having an arcuate cross section with the bristle-pack extending therebetween;

wherein the first structure includes a cantilevered portion that extends axially and radially over the first sheet;

wherein the first surface is orientated substantially parallel to the second surface; and wherein the brush seal is free-floating.

2. The dual-ended brush seal assembly of claim 1, wherein the cantilevered portion is configured to protect and hold the brush seal in place.

3. The dual-ended brush seal assembly of claim 1, wherein the first structure is a BOAS ring and the second structure is a vane shroud ring.

4. The dual-ended brush seal assembly of claim 1, wherein the brush seal is generally annular.

5. The dual-ended brush seal assembly of claim 1, wherein the brush seal includes a weld that fuses the bristle-pack and at least one of the first and second sheets together.

6. A dual-ended brush seal assembly comprising:
a first structure including a first surface;
a second structure including a second surface; and
a brush seal including a bent bristle-pack having a first end and an opposite second end, the first end projecting in a first direction and in sealing contact with the first surface, and the opposite second end projecting in a second direction and in sealing contact with the second surface, wherein the first and second directions traverse one-another, and the brush seal includes first and second sheets each having an arcuate cross section with the bristle-pack extending therebetween;

wherein the first structure includes a cantilevered portion that extends axially over the first sheet;

wherein the first and second structures are generally annular and concentric to one-another with the first surface spanning substantially axially and the second surface spanning substantially axially; and wherein the brush seal is free-floating relative to the first structure and the second structure.

7. The dual-ended brush seal assembly of claim 1, wherein at least one of the first and second sheets are made of a non-hardenable nickel-based alloy.

8. The dual-ended brush seal assembly of claim 7, wherein the non-hardenable nickel-based alloy is at least one of INCONEL 625 (AMS 5599), HASTALOY X (AMS 5536) and HAYNES 188 (AMS 5891).

9. The dual-ended brush seal assembly of claim 1, wherein the first and second ends are constructed and arranged to seal substantially radially.

10. The dual ended brush seal assembly of claim 1, wherein the second sheet includes a plurality of tabs for crimping against the bristle-pack.

11. The dual-ended brush seal assembly of claim 1, wherein
the bent bristle-pack extends longitudinally along a centerline between the first end and the opposite second end; and
the first sheet is longitudinally recessed along centerline from the first end and the opposite second end.

12. The dual-ended brush seal assembly of claim 11, wherein the second sheet is longitudinally recessed along centerline from the first end and the opposite second end.

13. The dual-ended brush seal assembly of claim 1, wherein the first sheet contacts the cantilevered portion thereby biasing the bent bristle-pack against the first surface and the second surface.

14. The dual-ended brush seal assembly of claim 1, wherein
the brush seal extends circumferentially about an axis;
the first surface is disposed a first radial distance from the axis; and
the second surface is disposed a second radial distance from the axis that is equal to the first distance.

15. The dual-ended brush seal assembly of claim 14, wherein cantilevered portion extends axially over the second surface.

16. A dual-ended brush seal assembly comprising:
a first structure including a first surface;
a second structure including a second surface parallel with the first surface; and
a brush seal including a bent bristle-pack having a first end and an opposite second end, the first end projecting in a first direction and in sealing contact with the first surface, and the opposite second end projecting in a second direction and in sealing contact with the second surface, wherein the first and second directions traverse one-another, and the brush seal includes first and second sheets each having an arcuate cross section with the bristle-pack extending therebetween;
the first structure further including a cantilevered portion that axially overlaps and contacts the first sheet.

* * * * *